United States Patent Office 3,817,920
Patented June 18, 1974

3,817,920
THERMOSETTING POLY(HEXASUBSTITUTED MELAMINES)
Bruce A. Langager, New Brighton, Minn., assignor to Minnesota Mining and Manufacturing Company, St. Paul, Minn.
No Drawing. Filed June 12, 1972, Ser. No. 261,923
Int. Cl. C08g 33/02
U.S. Cl. 260—47 R                                       17 Claims

ABSTRACT OF THE DISCLOSURE

Poly(hexasubstituted melamines) prepared by the Lewis acid catalyzed polymerization of arylene bis-(N-substituted)cyanamides, of the formula

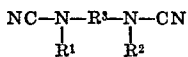

wherein $R^1$ and $R^2$ are broadly alkyl or aryl and $R^3$ is arylene, such polymers being curable to B stage as well as fully cured condition, having excellent high temperature stability and being useful as structural adhesives or binders.

---

This invention relates to a new high temperature stable polymer, and more particularly to high temperature stable polymers prepared from arylene bis-(N-substituted) cyanamides. The polymers of this invention contain melamine (triamino-s-triazine) segments in which each of the amine hydrogens has been replaced by an organic group, and these segments are linked by arylene groups.

BACKGROUND OF THE INVENTION

Polymers containing melamine segments have been prepared before. For example, in U.S. Pat. No. 2,824,088 there are described polymers, containing triarylamino-s-triazine residues, which are prepared by the reaction of trihalo-s-triazines with diamines, the reaction taking place with the liberation of hydrogen halide. The polymers retain a hydrogen atom on each of the amine groups present on each of the triazine segments, hence the polymer has a limited thermal stability.

Polymers containing melamine segments in which all of the hydrogens of each of the amine groups present on each of the triazine segments of the polymer have been replaced by an organic group are described in U.S. Pats. Nos. 3,382,221 and 3,277,065. These polymers, however, are prepared by the free radical catalyzed polymerization of hexasubstituted melamines wherein at least four of the substituents are allyl groups, and polymerization takes place via addition reaction at the allylic double bond. Moreover, polymers of these patents must be prepared in an inert atmosphere because the presence of oxygen in more than trace amounts inhibits the polymerization.

Polymers containing melamine segments have also been prepared by polymerization of organic biscyanamides. For example, in U.S. Pat. No. 3,291,673 and British Pat. No. 1,009,892, it is disclosed that alkylenedicyanamides may be polymerized by keeping them, with or without a basic accelerator, in a liquid state at an appropriate temperature. The polymers obtained, however, although polymerized without the elimination of volatile by-products, contain hydrogen atoms attached to the nitrogen atoms. In addition, U.S. Pat. No. 3,303,101 describes the preparation of copolymers by heating a mixture of monocyanamides and biscyanamides. According to the disclosure of Smolin and Rapoport, The Chemistry of Heterocyclic Compound, Interscience, New York, 1959, at page 357, the polymers described in these patents most likely contain iso-melamine segments.

Other previously described polymers containing melamine, or perhaps iso-melamine, segments are described in German Patents Nos. 1,958,320 and 1,965,907 and Netherlands Pat. No. 67/05,451, which describe polymeric products that are obtained by the reaction of organic poly(N-substituted) cyanamides and hydroxy or thiol compounds or mixtures thereof. These polymers, however, are believed to be significantly less thermally stable than the polymers according to the present invention. Moreover, attempts to use phenols as catalysts in preparation of the cyanamide monomers of the present invention have been uniformly unsuccessful.

SUMMARY OF THE INVENTION

The present invention provides novel thermosetting poly(hexasubstituted melamines) that are readily prepared by the Lewis acid catalyzed polymerization of correspondingly substituted bis-(N-substituted) cyanamides, a process that does not require condensation with elimination of volatile by-products, does not require an inert atmosphere, and does not involve the use of electronegative group-activated compounds nor the use of free radical generating catalysts or copolymerization with compounds containing active hydrogen, hydroxyl or thiol groups. Moreover, such poly(hexasubstituted melamines) possess high temperature stability and excellent flame retardancy.

It is, accordingly, an object of the present invention to provide useful poly(hexasubstituted melamines) having good thermal stability, dielectric properties, and flame retardancy.

It is also an object of the present invention to provide a process for the production of poly(hexasubstituted melamines) that does not require condensation with elimination of undesirable volatile by-products.

It is also an object of the present invention to provide a process for the production of poly(hexasubstituted melamines) by Lewis acid catalyzed polymerization of divalent bis-(N-substituted) cyanamides.

It is a further object of the present invention to provide a process for the production of poly(hexasubstituted melamines) that does not involve use of electro-negative group-activated compounds, free radical generating catalysts, or copolymerization with compounds containing active hydrogen, hydroxyl or thiol groups.

These and other objects and advantages of the present invention will be readily apparent to one skilled in the art upon reading the more detailed description that follows.

As used throughout this specification and the claims, the terms "lower alkyl" and "lower alkoxy" embrace both straight and branched chain alkyl and alkoxy radicals, respectively, containing from 1 to 6 carbon atoms, for example, but without limitation thereto, methyl, ethyl, n-propyl, isopropyl, n-butyl, sec-butyl, tert-butyl, n-pentyl, sec-pentyl, n-hexyl, 2-ethylbutyl, 2,3-dimethylbutyl and the like, in the case of "lower alkyl" and methoxy, ethoxy, n-propoxy, isopropoxy, n-butoxy, sec-butoxy, tert-butoxy, n-pentoxy, sec-pentoxy, n-hexyloxy, 2-ethylbutoxy, 2,3-dimethylbutoxy, and the like, in the case of "lower alkoxy"; the term "cyclo-lower alkyl" embraces lower alkyl-substituted and unsubstituted cycloalkyl radicals containing a total of from 3 to 9 carbon atoms, including, when substituted, the carbon atoms in the lower alkyl substituent or substituents, for example, but without limitation thereto, cyclopropyl, cyclobutyl, methylcyclopropyl, cyclopentyl, ethylcyclopropyl, dimethylcyclopropyl, 2-methylcyclobutyl, 3-ethylcyclopropyl, 2,3-dimethylcyclobutyl, 2-ethylcyclobutyl, 3-ethylcyclobutyl, cycloheptyl, 2,3-diethylcyclopropyl, 2-methyl-3-ethylcyclopropyl, 2,3,4-trimethylcyclobutyl, 2-ethyl-3-methylcyclohexyl, cycloheptyl, cyclononyl, and the like; the term "aryl" embraces both substituted and unsubstituted monovalent organic radicals derived from aromatic hydrocarbons by the removal of one hydrogen atom, for example, but without limitation thereto, phenyl, naphthyl, anthryl, pyridyl, carbazyl, indolyl, 2-triazinyl, furyl, benzoxazolyl, benzthiazolyl, and the like, such radicals, if desired, optionally bearing one or more lower alkyl, lower alkoxy, aryl, halogen, carbo-lower alkoxy, arylsulfonyl, or nitro substituents; the term "aryloxy" embraces substituted or unsubstituted aryloxy radicals, for example, but without limitation thereto, phenoxy, 1-naphthyloxy, 2-naphthyloxy, 1-anthryloxy, 2-anthryloxy, 9-anthryloxy, and the like, such radicals, if desired, optionally bearing one or more lower alkyl, lower alkoxy, aryl, halogen, carbo-lower alkoxy, arylsulfonyl or nitro substituents; and the term "halogen" includes chloro and fluoro.

The claimed poly(hexasubstituted melamines) consist essentially of segments (repeating units) having the structural formula (I) 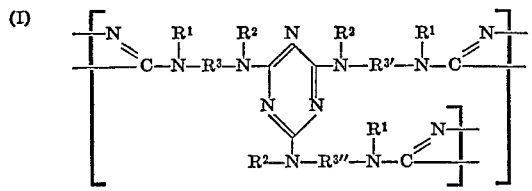

wherein $R^1$ and $R^2$ are the same or different and are lower alkyl (branched or straight chain), cyclo-lower alkyl, aryl and alkaryl radicals, said radicals further being optionally substituted by one or two chlorine or one to three fluorine atoms, or by lower perfluoroalkyl-lower alkoxy, or aralkoxy group, and $R^3$, $R^{3\prime}$ and $R^{3\prime\prime}$ are the same or different and are divalent arylene radicals of the formula (II) 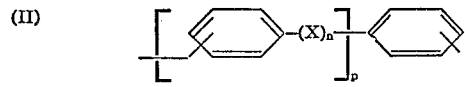

wherein $p$ is zero or one and $n$ is zero or one, and when $n$ is 1, X is

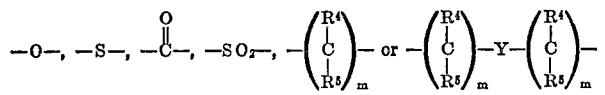

wherein $m$ is an integer from 1 to 20; Y is

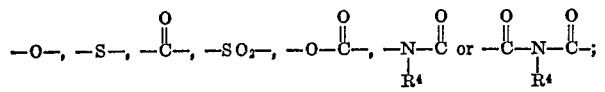

and $R^4$ and $R^5$ are the same or different and are hydrogen, lower alkyl or phenyl.

In the "B" stage, the materials are oligomeric and thermoplastic. They apparently contain a mixture of trimeric to hexameric chains of starting dicyanamides, which include not more than about 2 triazine rings in any one polymer chain. Their average molecular weight in the B stage is from about 300 to 3000. At this stage they retain useful solubility in chlorinated hydrocarbons such as methylene chloride, chloroform and the like.

In carrying out the process of the present invention, the poly(hexasubstituted melamine) B stage or final cured product is prepared by heating, in the presence of a Lewis acid catalyst, an arylene bis-(N-substituted) cyanamide of the formula (III)         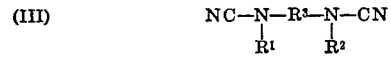

wherein $R^1$, $R^2$ and $R^3$ are as defined hereinabove, or a mixture of such bis-cyanamides in which $R^3$ is one or more different divalent radicals, i.e. $R^{3\prime}$ or $R^{3\prime\prime}$.

Among the arylene bis-(N-substituted) cyanamides that may be used to prepare the poly(hexasubstituted melamines) according to the present invention are those in which "arylene" is a divalent radical, such as, for example, 1,4-phenylene bis-(N-methylcyanamide),
1,4-phenylene bis-(N-ethylcyanamide),
1,2-phenylene bis-(N-methylcyanamide),
1,4-phenylene bis-(N-phenylcyanamide),
1,4-phenylene bis-(N-phenylcyanamide),
1,4-phenylene bis-N-(4-methoxyphenyl)-cyanamide,
1,4-phenylene bis-[N-(4-phenoxyphenyl) cyanamide],
4,4′-diphenyl bis-(N-phenylcyanamide),
4,4′-diphenyl bis-(N-methylcyanamide),
1,4-naphthalene bis-(N-methylcyanamide),
bis-[4-(N-methylcyanamino) phenyl] sulfide,
bis-[4-(N-phenylcyanamino) phenyl] ketone,
bis-[4-(N-phenylcyanamino) phenyl] sulfone, and
bis-[4-(N-phenylcyanamino) benzyl] ketone.

The preferred bis-(N-substituted) cyanamides are the arylene bis-(N-arylcyanamides) in which $R^1$ and $R^2$ are lower alkyl and X in the preceding formula is —O— or —CH$_2$—, e.g., bis-[4-(N-methylcyanamino) phenyl] methane and bis-[4-(N-methylcyanamino) phenyl] ether.

The arylene bis-(N-substituted) cyanamide starting materials are prepared by known procedures described in the literature including, for example, the preparation of arylene bis-(N-alkylcyanamides) by the von Braun reaction of cyanogen bromide on arylene bis-(N,N dialkyl-amines), Organic Reactions, Vol. 7, pp. 198–262, John Wiley and Sons Publishers, New York 1953; the dehydration of bis-ureas as described by Robinson, Can. J. Chem. 32, 901 (1954); the dehydration of thioureas as described by Kurzer, J. Chem. Soc., 1950, 3269 and the preparation of 1,4-dicyanopiperazine as described by Kramer, Chem. Zentral 1910 I, 1532 and Franchimont and Kramer, Rec. trav. chem. 31, 64 (1912).

The claimed poly(hexasubstituted melamines) are prepared by heating one or more arylene bis-(N-substituted) cyanamides with a Lewis acid catalyst. The temperature and time of heating are varied according to the amount of and nature of the Lewis acid catalyst chosen to effect the polymerization. Generally, temperatures range from about 150° C. to 350° C. and polymerization times from about 1 hour to about 48 hours, and from about 0.5 to about 15 weight percent of Lewis acid catalyst is used. The higher the temperature and the greater the amount of catalyst used, the shorter is the time required to reach the B-stage and the thermoset stage of the polymer.

The preferred conditions for preparing the claimed poly(hexasubstituted melamines) are to heat the arylene bis-(N-substituted) cyanamides at a temperature from 200° to 250° C. for from about 2 to 24 hours in the presence of 1 to 5 weight percent of a Lewis acid catalyst. The polymerization reaction is readily controlled. For any given amount of catalyst, the polymerization proceeds with controlled application of heat to the B-stage, where the polymers formed are soluble and thermoplastic, or is carried on to the thermoset stage where the polymers are crosslinked and, therefore, insoluble. By discontinuing heating at about the B-stage, regardless of whether a high or low percentage of catalyst is employed in the polymerization, the polymerization can be halted. At this stage, the polymer can be stored at lower temperatures for an essentially unlimited period of time and, when desired, converted to the thermoset stage simply by the application of heat.

Lewis acid that may be used as catalyst for the polymerization of the arylene bis-(N-substituted) cyanamides is defined as a substance that is electron-deficient and tends to form a coordinated bond by accepting a pair of electrons. Suitable Lewis acids are selected from the "hard" and "intermediate" Lewis acids as classified in Pearson, J. Am. Chem. Soc. 85 35333 (1963) and include but are not limited to aluminum chloride, aluminum bromide, aluminum iodide, stannic chloride, antimony trichloride, indium trichloride, cobaltic chloride, cobaltic bromide, indium oxide, cobaltic oxide, ferric oxide, ferric chloride, manganic acetate, manganic acetylacetonate, manganous acetylacetonate, titanium tetrachloride, titanium dioxide, boron trifluoride, boron trifluoride etherate, boron trichloride, ferrous chloride, cobaltus chloride, nickel chloride, manganese dioxide, zinc chloride, zinc oxide, lead chloride, lead iodide, and the like. Some of these materials are of low activity and are essentially fillers; when used they may require the addition of more active catalyst to achieve complete cure within a practical length of time.

The preferred Lewis acid catalysts are those that have a low volatility, such as, for example, Lewis acids that do not volatilize or decompose below about 200° C., and particularly indium trichloride or zinc chloride and the like.

The polymerization of the divalent arylene bis-(N-substituted) cyanamides according to the present invention may be carried out in the presence of volatile Lewis acid catalysts, however, with such catalysts it is necessary that, e.g., pressure equipment be utilized during the polymerization to confine the catalyst. The preferred catalysts are indium trichloride, stannic chloride, antimony trichloride, cobaltic chloride, zinc chloride, ferric chloride, and the corresponding bromides.

By performing the polymerization of the arylene bis-(N-substituted) cyanamides at lower polymerization temperatures and shorter polymerizing periods, as described above, B-stage or thermoplastic hexasubstituted polymelamines are obtained. These B-stage polymelamines can also be stored for prolonged time without curing, yet are usable at any subsequent time and can then be readily cured by the application of heat.

The claimed poly(hexasubstituted melamines) are particularly well suited for use in corrosive atmospheres and in environments subject to high temperatures because of their solvent resistance and high thermal stability, and the fact that no volatile material is given off during polymerization. The absence of any —N—H groups in these polymers is believed to confer excellent weatherability and stability to corrosive environments, as well as thir superior dielectric properties.

The polymers of the invention may be modified with a variety of fibrous and finely divided inert filler materials such as clay, quartz flour, asbestos, glass filaments and woven and unwoven fabrics, ceramic particles and fibers, metal particles and fibers, and carbon powders and fibers.

Laminates and composites, for example, are readily made by impregnating the filler material with a mixture of arylene bis-(N-substituted) cyanamides or mixture of arylene bis-(N-substituted) cyanamides and an effective amount of the selected Lewis acid catalyst and simply heating the mixture to cause polymerization. If it is desired to produce storable and subsequently processable (e.g., moldable) laminates or molded composites, the heating may be carried out only to the formation of B-stage polymer. At a later time such "green" laminates or composites can be shaped to desired form and cured in that condition.

Laminates and composites with filler materials may also be made using B-stage poly(hexasubstituted melamines) that are prepared from one or more arylene bis-(N-substituted) cyanamides. In this instance the B-stage polymer may be dissolved in a suitable solvent, the filler impregnated with the solution, the solvent removed, and the impregnated filler molded and cured to the thermoset stage or the B-stage polymer may be melted, the filler impregnated with molten polymer, and the filled material molded and cured to the thermoset stage.

The following examples are illustrative of the invention but are not intended in any way to limit the scope thereof.

EXAMPLE 1

A mixture of 100 parts bis-[4-(N-methylcyanamino)-phenyl] methane and 2 parts by weight of indium trichloride is heated at 200° C. for 4 to 8 hours to form a B-stage poly(hexasubstituted melamine). On cooling, a brittle clear glass is obtained that is thermoplastic and when cold can be readily comminuted to a powder. It is soluble in methylene chloride or other chlorinated hydrocarbons. Tenaciously adhering coatings can be made on metal, glass, and ceramic surfaces by applying a solution of the polymer to the surface, drying and heating the surface at 200° C. for 14 hours and 260° C. for 2 hours. Final curing of the B-stage polymer was effected by heating at 200° C. for 14 hours and then at 260° C. for 2 hours. The cured polymer showed a 5% weight loss on isothermal heating at 260° C. for 1200 hours. The cured polymer is insoluble in all common organic solvents and by differential thermal analysis does not exhibit a glass transition temperature. The dynamic modulus of elasticity was determined on a sample of the cured polymer using the Complex Module type 3930 apparatus. The sample was found to have the following characteristics.

| Sample: | Modulus (p.s.i.) |
| --- | --- |
| Initially | $4.1 \times 10^5$ |
| After 170 hours at 260° C. | $3.9 \times 10^5$ |
| After 500 hours at 260° C. | $4.3 \times 10^5$ |

The above data shows the cured poly(hexasubstituted melamine) of Example 1 to be stable to high temperature aging for at least 500 hours at 260° C. since during this treatment the flexural modulus of a sample remains essentially unchanged.

EXAMPLE 2

Twenty parts of the B-stage hexasubstituted melamine polymer described in Example 1 are dissolved in about 40 parts of chloroform and used to saturate a glass wool web. The web is air-dried and then vacuum-dried for an additional 1½ hours at a pressure of about 15 mm. mercury at 60° C. The dried web is cut into portions and a 5-ply laminate assembled, placed in a press, pressed at 500 p.s.i. and heated 1 hour at 230° C., 1 hour at 260° C. and 1 hour at 290° C. On removing from the press, there is obtained a laminate containing 75% glass wool and 25% cured poly(hexa-substituted melamine). The laminate is strong, tough, and moisture and solvent resistant. The laminate has dynamic modulus of elasticity of $3.9 \times 10^6$ p.s.i.

EXAMPLE 3

The procedure described in Example 1 is carried out using bis - [4-(N-methylcyanamino) phenyl] ketone. A hexa-substituted melamine B-stage polymer similar to that obtained in Example 1 is obtained from which coating, bulk polymer, impregnations, and adhesives can be prepared that are curable to a hard glassy polymer.

EXAMPLE 4

The procedure described in Example 1 is carried out using bis-[4-(N-methylcyanamino) phenyl]-ether. A poly(hexasubstituted melamine) similar to that obtained in Example 1 is obtained in B-stage and in final cured form.

EXAMPLE 5

The procedure described in Example 1 is carried out using bis-[4-(N-ethylcyanamino) phenyl] ether. A poly(hexasubstituted melamine) similar to that obtained in Example 1 is obtained in B-stage form, having average molecular weight determined to be about 390. This B-stage polymer could be cured as in Example 1, to a strong polymer.

EXAMPLE 6

Repeating Example 1 and using from 0.5 to 6 parts of indium chloride, a polymer is obtained that has characteristics similar to those of the polymer prepared in Example 1. Mixtures containing 6 parts of indium chloride are completely cured after 2 hours at 200° C. and 2 hours at 260° C. Mixtures containing 0.5 part of indium chloride require about 48 hours at 200° C. and 2 hours at

EXAMPLE 7

Into separate reaction vessels are placed 2 parts bis-[4-(N-methylcyanamino) phenyl] methane, and the amount of Lewis acid catalyst shown in the following table is thoroughly mixed into it. The time required to effect polymerization to a hard, infusible polymer was determined and is recorded in the table.

| Catalyst | Amount (parts by wt.) | Time to cure, hrs. |
|---|---|---|
| a Ferric oxide | 2.0 | 2½ |
| b Zinc oxide | 0.005 | 18 |
| c Cobaltus oxide | 0.05 | >18 |
| d Ferric chloride | 0.05 | 18 |
| e Manganous acetylacetonate | 0.1 | 18 |
| f Manganic acetylacetonate | 0.1 | 18 |

In a similar manner other Lewis acids including titanium dioxide, manganous oxide, niclous oxide, stannous oxide, stannic fluoride, antimony trichloride, nickel chloride, and zinc chloride catalyze polymerization of bis-(N-substituted) cyanamides at temperatures of 200 to 270° C.

EXAMPLE 9

A series of filled poly(hexasubstituted melamines) are prepared by placing into reaction vessels 2 parts of bis-4-(N-methylcyanamino) phenyl methane, 0.05 parts of indium chloride, and the amount of filler shown in the following table. After the contents of each are thoroughly mixed, the vessels are placed into an oven at 270° C. and heated. The time to effect polymerization is noted in the table.

| Filler | Amount (parts by wt.) | Time to cure, hrs. |
|---|---|---|
| a Ferric oxide | 2.0 | 0.5 |
| b Zinc oxide | 0.35 | 3 |
| c Chopped glass | 0.75 | 4 |
| d Glass beads | 4.0 | 4 |
| e Crushed sand | 1.0 | 4 |
| f Iron powder | 0.35 | 4 |
| g Cupric oxide | 0.35 | 4 |

In a similar manner other fillers including fibrous materials and filaments of metals, ceramic, carbon, and glass may be incorporated into the polymelamines of the invention.

What is claimed is:

1. Poly(hexasubstituted melamines) consisting essentially of segments having the formula

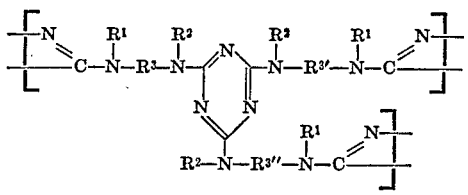

wherein $R^1$ and $R^2$ are each lower alkyl, cyclo-lower alkyl, aryl and alkaryl, each being optionally substituted by one or two chlorine or one to three fluorine atoms or by a lower perfluoroalkyl, lower alkoxy or aralkoxy group; $R^3$, $R^{3'}$ and $R^{3''}$ are the same or different and are divalent arylene radicals of the formula

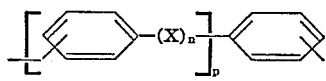

where $p$ is zero or one and $n$ is zero or one, and when $n$ is 1, X is

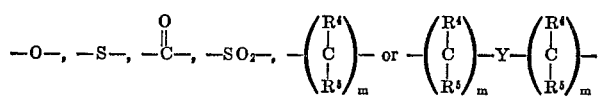

wherein $m$ is an integer from 1 to 20; Y is

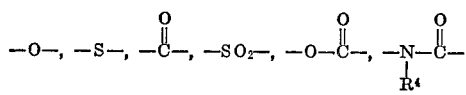

or

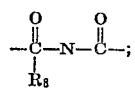

$R^4$ and $R^5$ are each hydrogen, lower alkyl or phenyl; and about 0.5 to 15 weight percent of Lewis acid catalyst.

2. Polymer according to claim 1 in thermoset, insoluble cured form.

3. "B"-stage polymer according to claim 1, in thermoplastic, methylene chloride-soluble form, being capable of further curing to thermoset condition upon further heating thereof.

4. Polymer according to claim 1, wherein $R^3$ is

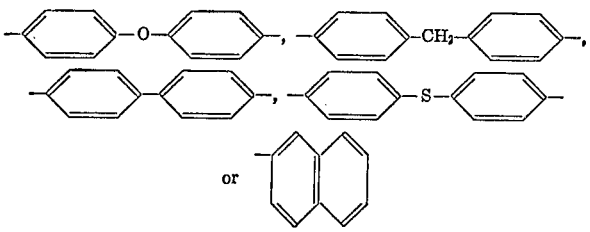

5. Polymer according to claim 1, wherein $R^1$ and $R^2$ are lower alkyl and $R^3$ is a divalent arylene radical derived from diphenyl methane.

6. Polymer according to claim 1, wherein $R^1$ and $R^2$ are lower alkyl and $R^3$ is a divalent arylene radical derived from diphenyl ether.

7. Polymer according to claim 1, consisting essentially of repeating units of the formula

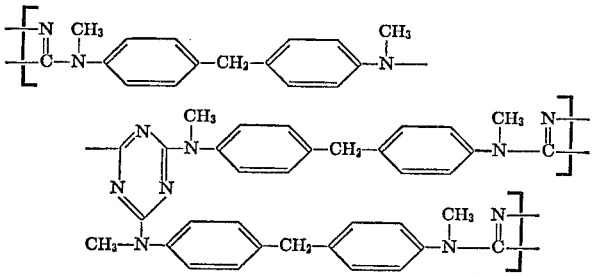

8. Polymer according to claim 7, in "B"-stage condition.

9. Polymer according to claim 1, consisting essentially of repeating units of the formula

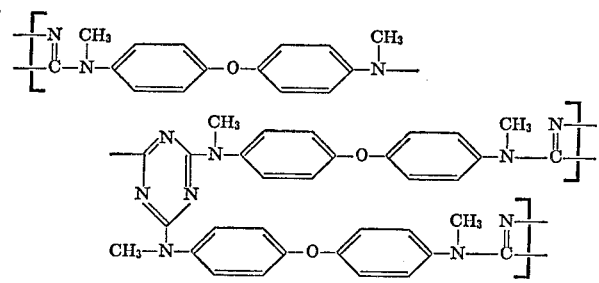

10. Polymer according to claim 8, in "B"-stage condition.

11. Polymer according to claim 1, consisting essentially of repeating units of the formula

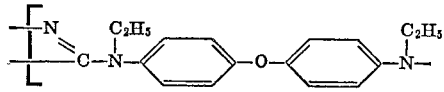

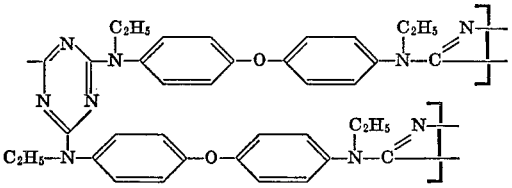

12. Polymer according to claim 8, in "B"-stage condition.

13. Polymer according to claim 1 containing inert filler material.

14. Polymer according to claim 3 containing inert filler material.

15. Process for making polymers according to claim 1, which comprises heating, in the presence of Lewis acid catalyst, compound of the formula

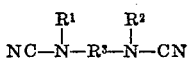

wherein $R^1$ and $R^2$ are each lower alkyl, cyclo-lower alkyl, aryl and alkaryl, each being optionally substituted by one or two chlorine or one to three fluorine atoms or by a lower perfluoroalkyl, lower alkoxy or aralkoxy group; $R^3$ is a divalent arylene radical of the formula

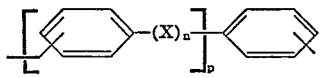

where $p$ is zero or one and $n$ is zero or one, and when $n$ is 1, X is

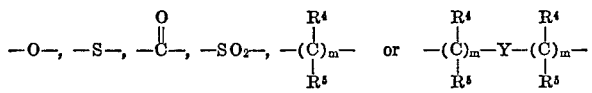

wherein $m$ is an integer from 1 to 20; Y is

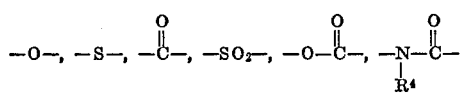

or

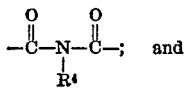

$R^4$ and $R^5$ are each hydrogen, lower alkyl or phenyl.

16. Laminates consisting essentially of thin layers of self-supporting webs adhered by polyhexasubstituted melamines) consisting essentially of segments having the formula

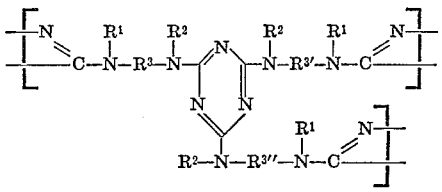

wherein $R^1$ and $R^2$ are each lower alkyl, cyclo-lower alkyl, aryl and alkaryl, each being optionally substituted by one or two chlorine or one to three fluorine atoms or a lower perfluoroalkyl, lower alkoxy or aralkoxy group; $R^3$, $R^{3'}$ and $R^{3''}$ are the same or different and are arylene radicals of the formula

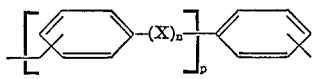

where $p$ is zero or one and $n$ is zero or one, and when $n$ is 1, X is

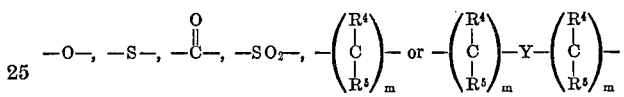

wherein $m$ is an integer from 1 to 20; Y is

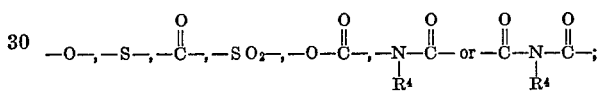

and $R^4$ and $R^5$ are each hydrogen, lower alkyl or phenyl; and about 0.5 to 15 weight percent of Lewis acid catalyst.

17. Laminates according to claim 16, in which the polymelamine is present in "B"-stage form and capable of being fabricated to pre-selected form and cured to thermoset condition in that form.

References Cited

UNITED STATES PATENTS

| | | | |
|---|---|---|---|
| 3,595,900 | 7/1971 | Loudas et al. | 260—453 |
| 3,654,192 | 4/1972 | Vogel | 260—2 R |
| 3,694,408 | 9/1972 | Hynds et al. | 260—47 R |
| 3,694,410 | 9/1972 | Oehmke | 260—47 R |

FOREIGN PATENTS

| | | |
|---|---|---|
| 1,164,523 | 9/1969 | Great Britain. |
| 1,958,320 | 8/1970 | Germany. |

MELVIN GOLDSTEIN, Primary Examiner

U.S. Cl. X.R.

161—192; 260—2 R, 37 M and N, 65, 78.4, 79, 79.3 M